(No Model.)
G. S. BRIGGS.
MECHANISM FOR SHAPING PLOWSHARES.
No. 430,988. Patented June 24, 1890.
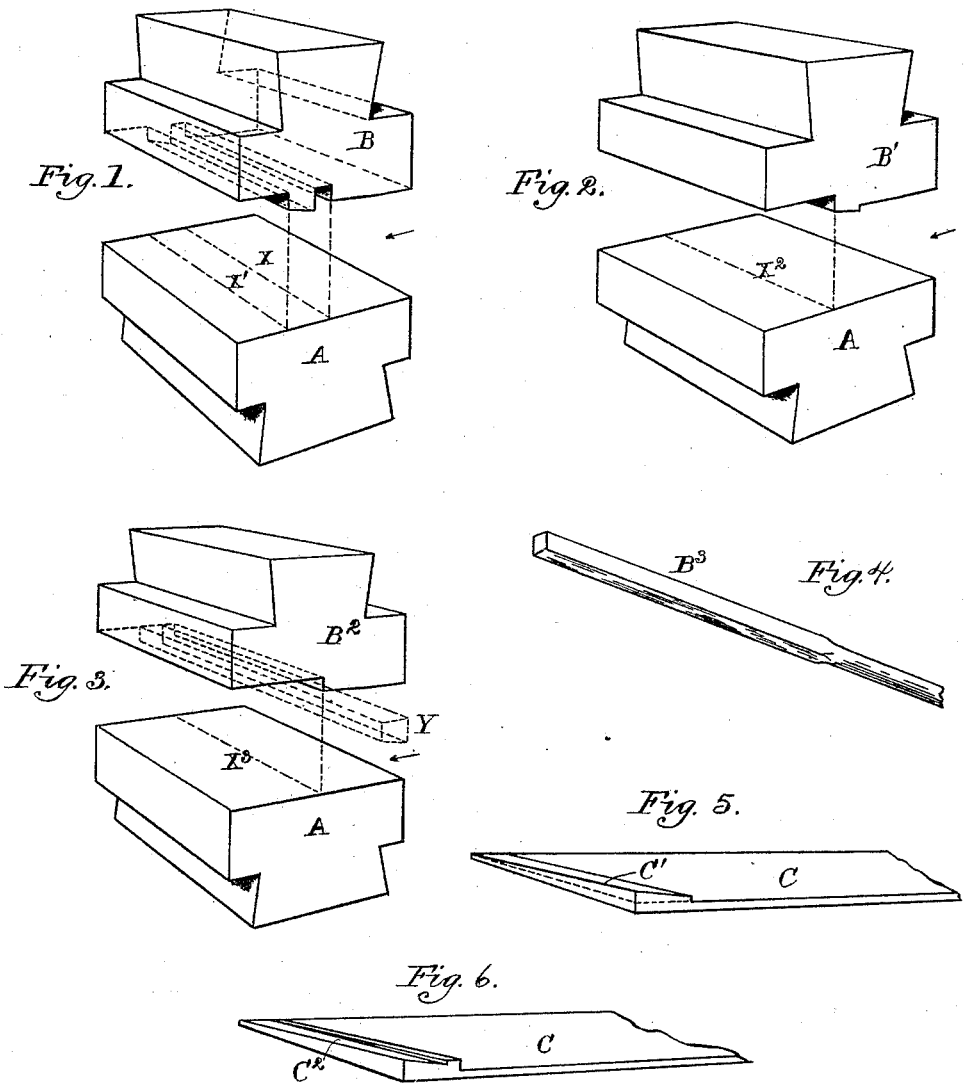
Witnesses:
E. F. Dowling.
H. E. Hollister.
Inventor:
George S. Briggs,
per L. L. Morrison,
Attorney.

UNITED STATES PATENT OFFICE.

GEORGE S. BRIGGS, OF ROCKFORD, ILLINOIS, ASSIGNOR TO THE L. A. WEYBURN COMPANY, OF SAME PLACE.

MECHANISM FOR SHAPING PLOWSHARES.

SPECIFICATION forming part of Letters Patent No. 430,988, dated June 24, 1890.

Application filed April 18, 1890. Serial No. 348,560. (No model.)

*To all whom it may concern:*

Be it known that I, GEORGE S. BRIGGS, a citizen of the United States, residing at Rockford, in the county of Winnebago and State of Illinois, have invented certain new and useful Improvements in Mechanism for Shaping Plowshares, of which the following is a specification.

The object of this invention is the production of mechanism for making plowshares of the form shown, described, and claimed in Letters Patent of the United States No. 421,661.

This invention consists of a die-block and interchangeable die-sections adapted for use therewith in shaping the landside ends of plowshares.

Referring to the accompanying drawings, which form a part of this specification, Figures 1, 2, and 3 are views in isometric of die-blocks in operative positions and relations, adapted to be used in die-presses of the ordinary form. Fig. 4 is an isometric view of a die-section to be used in connection with the parts in Fig. 3. Figs. 5 and 6 are plowshare-blanks in different stages of manufacture.

Like letters of reference indicate corresponding parts throughout the several views.

A are die-blocks.

B B' B$^2$ B$^3$ are welding and shaping die-sections.

C is a fragment of a share-blank. C' is a patch laid thereon preparatory to being welded thereto and shaped to receive a landside. (Not shown.) Indentical results may be obtained by using the die-block A with either the die-sections B B' or B$^2$ B$^3$ in succession.

The share-blanks should be inserted between the die-block and die-sections from the right, as indicated by the arrows.

My improvement is operated as follows: Take the share-blank and patch C C', both being properly heated and the latter laid upon the former, as in Fig. 5, and insert them between the parts A B until the position indicated by the dotted line X is reached. Let the part B descend and rise until the patch C' is welded to the blank C. Afterward further insert the blank C until the position indicated by the dotted line X' is reached. Then let the part B operate, as before, until the upper side of the patch C' is shaped to receive a landside—that is, provided with a beveled groove C$^2$, as shown in Fig. 6. Insert the share-blank and patch C C' between the parts A B' to the position indicated by the dotted line X$^2$. Let the part B' operate and the patch C' will be welded to the share-blank C and provided with the beveled groove C$^2$ without changing the position of the blank. Insert the share-blank and patch C C' between the parts A B$^2$ to the position indicated by the dotted line X$^3$. Let the part B$^2$ operate until the patch C' is welded to the share-blank C. Next insert the die-section B$^3$ between the parts A B$^2$, as indicated by the dotted lines Y, and let the part B$^2$ operate. The die-section B$^3$ will thereby be forced downward and form the beveled groove C$^2$ in the upper side of the patch C'.

If the share-blank C and patch C' are originally produced in a single piece, obviously the bevel-groove C$^2$ could be formed therein by means of either set of devices shown and described herein.

I claim—

1. The herein-described mechanism for shaping the landside ends of plowshares, consisting of a die-block and interchangeable welding and shaping disks, substantially as and for the purpose specified.

2. The herein-described mechanism for shaping the landside ends of plowshares, consisting of a die-block A and the interchangeable welding and shaping die-sections B, B', B$^2$, and B$^3$, substantially as and for the purpose set forth.

GEORGE S. BRIGGS.

Witnesses:
L. L. MORRISON,
E. F. DOWLING.